UNITED STATES PATENT OFFICE.

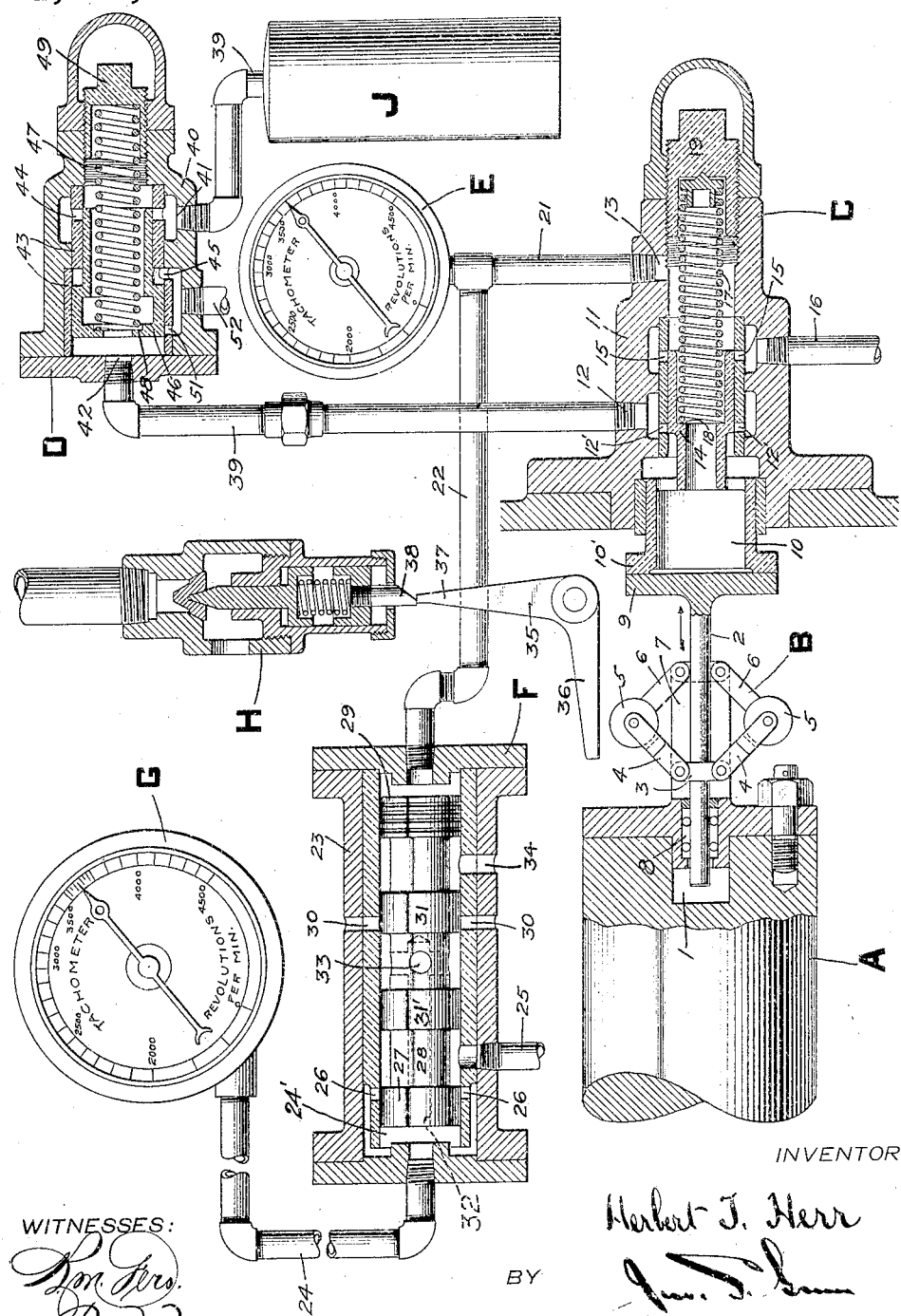

HERBERT T. HERR, OF PITTSBURGH, PENNSYLVANIA, ASSIGNOR, BY MESNE ASSIGNMENTS, TO THE WESTINGHOUSE MACHINE COMPANY, OF EAST PITTSBURGH, PENNSYLVANIA, A CORPORATION OF PENNSYLVANIA.

SPEED-INDICATOR.

1,226,073.    Specification of Letters Patent.    Patented May 15, 1917.

Application filed March 23, 1912. Serial No. 685,722.

*To all whom it may concern:*

Be it known that I, HERBERT T. HERR, a citizen of the United States, and a resident of Pittsburgh, in the county of Allegheny and State of Pennsylvania, have made a new and useful Invention in Speed-Indicators, of which the following is a specification.

This invention relates to mechanisms for indicating the speed of a rotating agent and has for an object to produce such a mechanism, in which the indicating means may be located either adjacent to or at a distance from the agent, the speed of which is to be ascertained.

A further object is to produce a speed indicating mechanism which will simultaneously indicate the speed of a rotating agent at a point adjacent to and also at one or more points remote from the agent.

A further object is to produce a mechanism for indicating the speed of a rotating agent, which includes means for controlling the speed of the rotatable agent by shutting off the motive power driving the agent when the agent exceeds a safe or determined speed.

A further object is to produce a speed indicating mechanism including two or more fluid actuated tachometers, in which one or more of the tachometers are located at a point remote from the agent, the speed of which is to be ascertained, and in which improved means are employed for controlling the delivery of actuating fluid to the tachometers and synchronizing the tachometers.

These and other objects I attain by means of apparatus embodying the features herein described and illustrated.

In the drawings I have illustrated partly in plane and partly in section a device constructed in accordance with my invention.

The apparatus illustrated as an embodiment of the invention includes a rotatable agent or shaft A, the speed of which is to be indicated, a tachometer E located adjacent to the shaft A, and a fluid distributing device C, which receives fluid from a source of fluid under pressure J through a pressure regulating device D, and which is controlled in its operation by a speed responsive device B driven by the shaft A and responsive to variations in the speed of the shaft. The apparatus also includes a tachometer G, located at a distance from the shaft A, and a device F which operates in response to variations in the pressure delivered by the device C and controls the delivery of actuating pressure to the tachometer G. This device F may be termed a synchronizing device since it synchronizes the operation of the tachometer G with that of the tachometer E.

The distributing device C consists of a casing 11, provided with an inlet port 12, which communicates with the source of fluid supply through a pipe 39, and a delivery port 13, which communicates with the tachometer E and the device F through pipe 21 and branch pipe 22 respectively. A bushing is located within the casing and is provided with port 12' communicating directly with the inlet port 12, and ports 15 communicating directly with a discharge port or pipe 16 with which the casing is provided. This bushing forms a guide for a hollow valve 14, which is adapted to control communication between the delivery port 13 and the inlet port 12 and also between the port 13 and the discharge pipe 16 for the purpose of regulating the pressure delivered by the device C to the pipe 21. As illustrated, the valve 14 is so constructed that as it closes the ports 15, it opens the port 12' and vice versa, closes the port 12' as it opens the ports 15. The valve, however, may occupy an intermediate position in which both sets of ports are closed. As illustrated, the valve is operatively connected to a cylindrical member 10' which together with a disk 9 incloses a chamber 10. This chamber is always in open communication with the port 13 through the valve 14. The valve is normally pressed to open the ports 15 and close the port 12' by a spring 17, located between a shoulder 18 on the valve and an adjustable spring block 19.

The disk 9 is shown formed integrally with a spindle 2, which forms a part of the device B and projects into a recess formed in the end of the shaft A, being guided by means of ball-bearings 8, located within the recess. As illustrated, the device B consists of an ordinary weight governor, one pair of links 6 of the weights 5 being pivotally connected to a bracket 7, mounted on the shaft A, and the other pair of links 4 being pivotally connected to a collar 3, rigidly mounted on the spindle 2. With this arrangement the centrifugal force of the weights 5 tends to move the spindle in opposition to the pressure of the spring 17, which always presses the member 10' against the disk 9.

The operation of the devices B and C is as follows: With the shaft A at rest, the valve 14 is held by the spring 17 in such a position that the ports 12' are closed and the ports 15 are open. This places the port 13 in communication with discharge pipe 16 and consequently insures the maintenance of discharge pressure within the delivery pipes 21 and 22. As the shaft A speeds up, the balls 5 move outwardly and consequently move the spindle 2 longitudinally, thereby shifting valve 14 and opening the ports 12' and closing the ports 15. This places the port 13 in communication with the port 12 and, if fluid under pressure is supplied through the piping 39, pressure will pile up within the chamber 10 and also in the distribution system communicating with the port 13, until the fluid pressure within the chamber 10 and the pressure of spring 17 are sufficient to shift the valve 14 in opposition to the thrust on the disk 9 occasioned by the centrifugal force of the balls 5. This will close the ports 12' and, if the fluid pressure acting on the disk 9 and the pressure of the spring 17 continues to preponderate over the centrifugal force, the valve 14 will continue to move in opposition to the centrifugal force and will open the ports 15, thereby relieving the pressure within the chamber 10 by discharging fluid through the discharge pipe 16. As equilibrium is established between the force acting on opposite sides of the disk 9, the valve 14 will move to an intermediate position in which both the ports 12' and 15 are closed and in which the pressure within the chamber 10 and consequently within the pipes 21 and 22 is proportional to the speed of the shaft A. If, now, the shaft A increases in speed the centrifugal force will preponderate over the spring and fluid pressure acting on the disk 9, and the ports 12 will open, admitting additional pressure into the chamber 10 and consequently to the pipes 21 and 22 until equilibrium of pressure on disk 9 is again established. A decrease in the speed of the shaft will cause the centrifugal force to decrease and consequently will cause the spring pressure and pressure on the disk to preponderate and open the discharge ports 15, thereby diminishing the pressure within the chamber 10 an amount proportional to the reduction in speed of the shaft A. In this way the pressure delivered by the distributing device C is controlled by the speed responsive device B and will vary in intensity in direct proporton to variations in the speed of the shaft.

In order to insure the delivery of a constant pressure to the port 12, I have illustrated the pressure regulating device D interposed in the pipe 39. As illustrated, the device D includes a casing 40 provided with an inlet 41, which communicates with the source of fluid supply, (shown as a tank J), and a delivery port 42, which communicates with the port 12, and a discharge port or pipe 52. Located within the casing is a bushing 43, which incloses a valve 46 and is provided with delivery ports 44 and discharge ports 51, so arranged that they are controlled by the valve 46. The valve 46 is provided with an actuating spring 47, located between a shoulder 48 on the valve and an adjustable spring block 49, and normally adapted to move the valve to open the ports 44 and close the ports 51. The arrangement of the valve is such that the fluid pressure, delivered through the ports 44, moves the valve in opposition to the pressure of the spring, and opens the ports 51 and closes the ports 44. This is accomplished by forming the valve in the shape of a differential piston and providing a differential chamber at the junction of the two diameters of the piston, which is placed in communication with the discharge pipe 52 by ports 45. A proper adjustment of the spring 47 will insure the delivery of the desired pressure to the piping 39 as long as the pressure within the tank J exceeds the desired pressure.

In practice I find it desirable to employ an incompressible fluid, such as oil, for actuating the tachometer E. The loss in pressure, due to pipe friction and also the resistance of the column of liquid contained within the communicating piping would prevent the tachometer G from correctly indicating the velocity of the shaft A if the tachometer G is located at some distance from the tachometer E and particularly if it is located above the tachometer E. I therefore interpose the synchronizing device F between the distributing device C and the tachometer G, and I preferably employ an elastic fluid, such as air under pressure, for operating the remote tachometer. The device F, as illustrated, consists of a casing 23 provided with a port which communicates with pipe 22, a port through which air under pressure is delivered from a pipe 25, and a delivery port which communicates with a pipe 24 leading to the tachometer G. A plunger 29 is located within the casing 23 and is adapted to control the delivery of fluid through ports 26 and 30 formed within a bushing located within the casing and surrounding the plunger. The port 26 is controlled by a collar 27 formed on the plunger 29 and communicates with a delivery chamber 24' which communicates with the piping 24; while the port 30 communicates with a registering discharge port formed in the casing 23 and is adapted to be placed in communication with an exhaust chamber located within the casing and segregated by means of collars 31 and 31' formed on the plunger 29. The plunger is provided with a longitudinally extending passage 32 which communicates with the chamber 24' and with the discharge chamber by means of branch passages 33.

Fluid under pressure delivered through the pipe 22 tends to move the plunger 29 in a direction to close the ports 30 and open the ports 26 and to deliver fluid under pressure from the pipe 25 to the pipe 24. When the pressure so delivered exceeds the pressure delivered through the pipe 22, the plunger moves to close the port 26 and to open the port 30. In this way the position of the plunger will adjust itself until the pressure in the chamber 24' equals the pressure delivered through the piping 22, and consequently the tachometer G will register the same as the tachometer E, or will synchronize with the tachometer E. It will, of course, be apparent that the plunger 29 may be so constructed that the pressure delivered to the pipe 24 may be either greater or less than the pressure delivered to the pipe 22, but even so, variations of pressure within the pipe 22, will cause corresponding variations within the pipe 24. A port 34 is provided in casing 23 to discharge oil leaking past the plunger.

In the drawings I have disclosed means for cutting off the delivery of actuating fluid to the driving element of the shaft A when the shaft exceeds a safe or determined speed. The means illustrated is similar to the safety stop illustrated in United States Patent No. 953,590 of March 29, 1910, to J. Breslove, and is provided with a bell crank 35 having one arm 36 in close proximity with the weights 5, so that it will be struck by the weights in case the shaft exceeds a determined speed or in case the governor breaks. The other arm 37 of the bell crank contacts with a pin 38 of the safety stop which operates in the manner described in the above mentioned patent.

Having thus described by invention, what I claim is:

1. In combination with two fluid actuated tachometers, a pressure responsive device responsive to variations in the pressure of the fluid delivered to one of the tachometers for controlling the operation of the other.

2. In combination, a liquid actuated tachometer, a fluid actuated tachometer, and a liquid actuated synchronizing device for synchronizing the two tachometers.

3. The combination with a liquid operated tachometer, means for supplying liquid thereto, an air operated tachometer, means for supplying air thereto, and means for synchronizing the movements of the mechanism of the second mentioned tachometer with those of the first.

4. The combination with a liquid operated tachometer, means for supplying liquid thereto, a motor-controlled valve for the liquid, an air operated tachometer, means for supplying air thereto, and means controlled by the valve for synchronizing the movements of the liquid operated tachometer with those of the air operated tachometer.

5. In combination with a device, the speed of which is to be indicated, a pressure actuated tachometer at a distance from the device, a pressure actuated tachometer adjacent to said device, and pressure actuated means responsive to the actuating pressure delivered to the adjacent tachometer, for controlling the operation of the remote tachometer.

6. The combination with two indicators, one of which is liquid operated and the other of which is air operated, sources of supply for the respective indicators and a synchronizing device operated by the liquid to control the air pressure admitted to the second mentioned indicator.

7. The combination with two tachometers, one of which is adapted to be operated by liquid and the other by air, a source of liquid supply under pressure, a pressure valve in the line between the source of supply and the liquid operated tachometer, a governing valve in the line between the pressure valve and the liquid operated tachometer, a second tachometer and means for synchronizing the movements of the second with those of the first.

8. The combination with a tachometer, a source of fluid supply for operating it, a pressure regulating valve between the source of supply and the tachometer, a controlling valve between the source of supply and the tachometer, and governor-controlled means for operating the second mentioned valve.

9. The combination of two tachometers connected together by a pipe or conduit, independent fluids for operating said tachometers, and a synchronizing valve in the pipe which connects said two tachometers.

10. In a mechanism for indicating the speed of a shaft, a fluid operated tachometer, a source of supply therefor, a pipe connecting the tachometer and the source of fluid supply, a controlling valve having sliding movement to throttle the fluid supplied to the tachometer, and a governor-actuated spindle having means in contact with said valve to operate it.

11. In a mechanism for indicating the speed of a shaft, a fluid operated tachometer, a source of supply therefor, a pipe connecting the tachometer and the source of fluid supply, a controlling valve in the pipe line having sliding movement to throttle the fluid supplied to the tachometer, and a governor-actuated spindle having means in contact with said valve to operate it, and an adjustable pressure regulating valve between the source of supply and the tachometer.

12. In combination with a pressure actuated tachometer, a source of fluid pressure, means for maintaining the pressure delivered from said source constant, a valve for controlling the delivery of fluid from said source to said tachometer, and centrifugally controlled means driven by the device, the speed of which is to be measured, for controlling the operation of the valve.

13. In combination with a pressure actuated tachometer, a source of fluid pressure, a speed responsive valve for controlling the delivery of fluid from said source to said tachometer, means for maintaining the pressure delivered to said valve substantially constant, a second tachometer, and pressure responsive means communicating with the first mentioned tachometer for controlling the operation of the second tachometer.

14. In combination with a rotatable shaft, the speed of which is to be determined, a pressure actuated tachometer for indicating the speed of the shaft, means responsive to the speed of the shaft for controlling the delivery of fluid under pressure to said tachometer, a second tachometer remote from the shaft and for indicating the speed of the shaft, and means controlled by said first mentioned means for controlling the operation of the second tachometer.

15. In combination with a rotatable shaft, the speed of which is to be indicated, a fluid actuated tachometer for indicating the speed of the shaft, speed responsive means for controlling the delivery of actuating fluid to the tachometer, a second tachometer, and fluid actuated means controlled by said speed responsive means for controlling the operation of the second tachometer.

16. The combination of a plurality of tachometers, a source of fluid under pressure, speed responsive means for delivering fluid to one of said tachometers, means for delivering substantially constant pressure from said source to said speed responsive means, and a synchornizing device responsive to the pressure of the fluid delivered by the speed responsive means for synchronizing the operation of all the tachometers.

17. In combination with a device, the speed of which is to be indicated, a pressure responsive tachometer, speed responsive means controlled by said device for controlling the delivery of fluid under pressure to the tachometer, a second tachometer for indicating the speed of the shaft, and pressure responsive means controlled by said speed responsive means for controlling the operation of the second tachometer.

18. In combination with a device, the speed of which is to be indicated, a hydraulically actuated tachometer, a source of liquid under pressure for delivering liquid to said tachometer, a speed responsive valve for controlling the delivery of liquid to the tachometer, a second tachometer, a source of fluid pressure supply for delivering fluid under pressure to the second tachometer, and means responsive to the pressure of the liquid delivered to the first tachometer for controlling the delivery of fluid under pressure to the second tachometer.

19. In combination with a device, the speed of which is to be indicated, a pressure actuated tachometer, a source of fluid under pressure, means for maintaining the fluid delivered from said source constant, a valve for controlling the delivery of fluid from said source to said tachometer, and a speed responsive governor actuated by the device for controlling the operation of said valve.

20. In combination with a device the speed of rotation of which is to be indicated, a pressure actuated tachometer for indicating the speed of said device, a source of actuating fluid for the tachometer, a valve between the source of fluid supply and the tachometer for controlling the delivery of fluid to the tachometer, speed responsive means driven by the device for controlling the operation of the valve, and means subjected to the fluid pressure delivered by said valve for opposing the movement of the valve in response to the speed responsive means.

In testimony whereof, I have hereunto subscribed my name this 21st day of March, 1912.

HERBERT T. HERR.

Witnesses:
C. W. McGHEE,
ANNA CLOHERTY.